United States Patent [19]
Funk

[11] Patent Number: 5,909,870
[45] Date of Patent: Jun. 8, 1999

[54] LOGGING TRACTOR ACCESSORY

[76] Inventor: James L. Funk, 1345 Walkers Knob Rd., Woodlawn, Va. 24381

[21] Appl. No.: 09/022,365

[22] Filed: Feb. 12, 1998

[51] Int. Cl.[6] .......................................................... B66D 1/36
[52] U.S. Cl. ............................ 254/325; 254/327; 254/394
[58] Field of Search .................................... 254/327, 325, 254/389, 394; 242/615.3

[56] References Cited

U.S. PATENT DOCUMENTS

| | | | |
|---|---|---|---|
| 1,694,931 | 12/1928 | Spain | 254/324 |
| 1,797,063 | 3/1931 | Meister | 254/325 |
| 1,918,409 | 7/1933 | Langdon | 254/327 |
| 1,945,976 | 2/1934 | Nourse et al. | 254/327 |
| 2,665,110 | 1/1954 | Tourneau | 254/327 |
| 3,739,928 | 6/1973 | Randall | 214/85.5 |
| 3,899,093 | 8/1975 | Allen | 214/85.5 |
| 4,400,132 | 8/1983 | Deline et al. | 414/569 |
| 4,479,453 | 10/1984 | Bonassi | 114/218 |
| 4,795,135 | 1/1989 | Scott | 254/327 |

Primary Examiner—Donald P. Walsh
Assistant Examiner—Minh-Chau Pham

[57] ABSTRACT

A new logging tractor accessory for supporting a cable from grapple-style skidding implement. The inventive device includes a housing secured to an arch of a logging tractor equipped with grapple-style skidding elements. The housing includes a pair of upwardly extending side members disposed in a parallel relationship. Upper ends of the side members have a horizontal support extending therebetween. Three guide members are provided including an upper guide member and a pair of side guide members. The upper guide member extends between the upper ends of the side members in a horizontal orientation. The pair of side guide members are secured to leading edges of the side members. A roller is secured between the side members downwardly of the horizontal support. The roller receives a cable from the logging tractor thereover.

10 Claims, 2 Drawing Sheets

LOGGING TRACTOR ACCESSORY

BACKGROUND OF THE INVENTION

1. Field of the Invention

The present invention relates to log skidders and more particularly pertains to a new logging tractor accessory for supporting a cable from grapple-style skidding implement.

2. Description of the Prior Art

The use of log skidders is known in the prior art. More specifically, log skidders heretofore devised and utilized are known to consist basically of familiar, expected and obvious structural configurations, notwithstanding the myriad of designs encompassed by the crowded prior art which have been developed for the fulfillment of countless objectives and requirements.

Known prior art log skidders include U.S. Pat. No. 4,113,124 to Muntjanoff; U.S. Pat. No. 4,278,392 to Meisel, Jr.; U.S. Pat. No. 4,102,528 to Cripe; U.S. Pat. No. 3,972,431 to Fischer; U.S. Pat. No. 4,436,475 to Blagg; and U.S. Pat. No. Des. 265,375 to Alvarez.

While these devices fulfill their respective, particular objectives and requirements, the aforementioned patents do not disclose a new logging tractor accessory. The inventive device includes a housing secured to an arch of a logging tractor equipped with grapple-style skidding elements. The housing includes a pair of upwardly extending side members disposed in a parallel relationship. Upper ends of the side members have a horizontal support extending therebetween. Three guide members are provided including an upper guide member and a pair of side guide members. The upper guide member extends between the upper ends of the side members in a horizontal orientation. The pair of side guide members are secured to leading edges of the side members. A roller is secured between the side members downwardly of the horizontal support. The roller receives a cable from the logging tractor thereover.

In these respects, the logging tractor accessory according to the present invention substantially departs from the conventional concepts and designs of the prior art, and in so doing provides an apparatus primarily developed for the purpose of supporting a cable from grapple-style skidding implement.

SUMMARY OF THE INVENTION

In view of the foregoing disadvantages inherent in the known types of log skidders now present in the prior art, the present invention provides a new logging tractor accessory construction wherein the same can be utilized for supporting a cable from grapple-style skidding implement.

The general purpose of the present invention, which will be described subsequently in greater detail, is to provide a new logging tractor accessory apparatus and method which has many of the advantages of the log skidders mentioned heretofore and many novel features that result in a new logging tractor accessory which is not anticipated, rendered obvious, suggested, or even implied by any of the prior art log skidders, either alone or in any combination thereof.

To attain this, the present invention generally comprises a housing secured to an arch of a logging tractor equipped with grapple-style skidding elements. The housing includes a pair of upwardly extending side members disposed in a parallel relationship. Upper ends of the side members have a horizontal support extending therebetween. Three guide members are provided including an upper guide member and a pair of side guide members. The upper guide member extends between the upper ends of the side members in a horizontal orientation. The pair of side guide members are secured to leading edges of the side members. A roller is secured between the side members downwardly of the horizontal support. The roller receives a cable from the logging tractor thereover.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new logging tractor accessory apparatus and method which has many of the advantages of the log skidders mentioned heretofore and many novel features that result in a new logging tractor accessory which is not anticipated, rendered obvious, suggested, or even implied by any of the prior art log skidders, either alone or in any combination thereof.

It is another object of the present invention to provide a new logging tractor accessory which may be easily and efficiently manufactured and marketed.

It is a further object of the present invention to provide a new logging tractor accessory which is of a durable and reliable construction.

An even further object of the present invention is to provide a new logging tractor accessory which is susceptible of a low cost of manufacture with regard to both materials and labor, and which accordingly is then susceptible of low prices of sale to the consuming public, thereby making such logging tractor accessory economically available to the buying public.

Still yet another object of the present invention is to provide a new logging tractor accessory which provides in the apparatuses and methods of the prior art some of the advantages thereof, while simultaneously overcoming some of the disadvantages normally associated therewith.

Still another object of the present invention is to provide a new logging tractor accessory for supporting a cable from grapple-style skidding implement.

Yet another object of the present invention is to provide a new logging tractor accessory which includes a housing secured to an arch of a logging tractor equipped with grapple-style skidding elements. The housing includes a pair of upwardly extending side members disposed in a parallel relationship. Upper ends of the side members have a horizontal support extending therebetween. Three guide members are provided including an upper guide member and a pair of side guide members. The upper guide member extends between the upper ends of the side members in a horizontal orientation. The pair of side guide members are secured to leading edges of the side members. A roller is secured between the side members downwardly of the horizontal support. The roller receives a cable from the logging tractor thereover.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
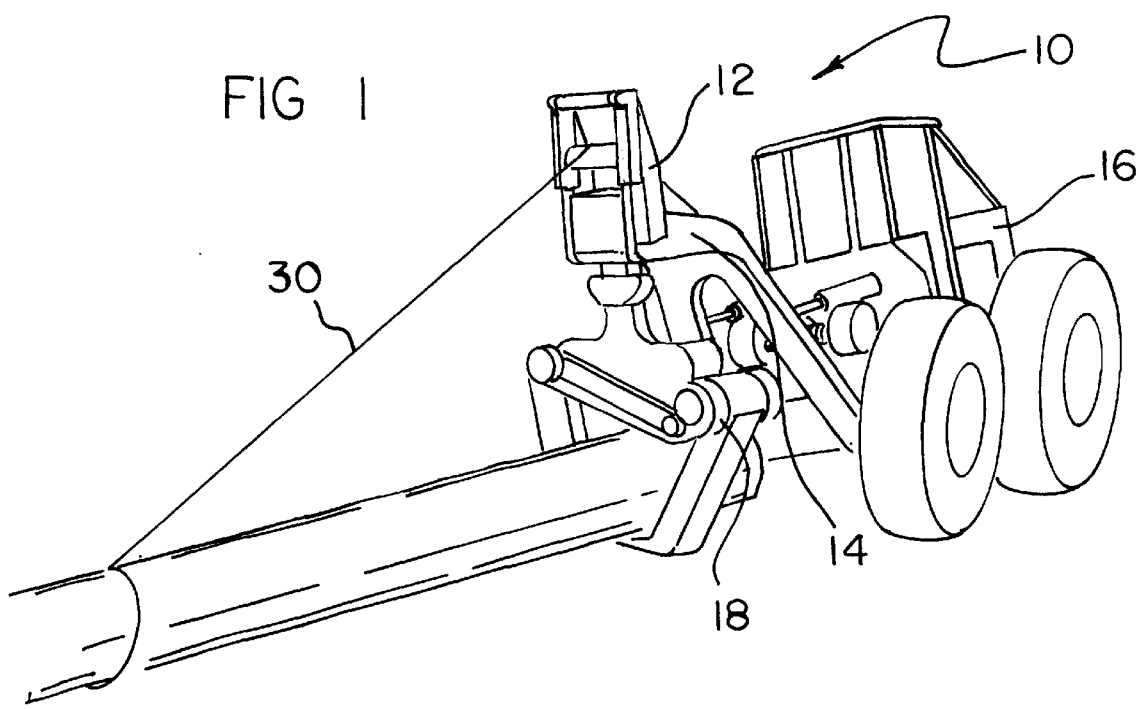
FIG. 1 is a perspective view of a new logging tractor accessory according to the present invention illustrated in use.
Figure 2:
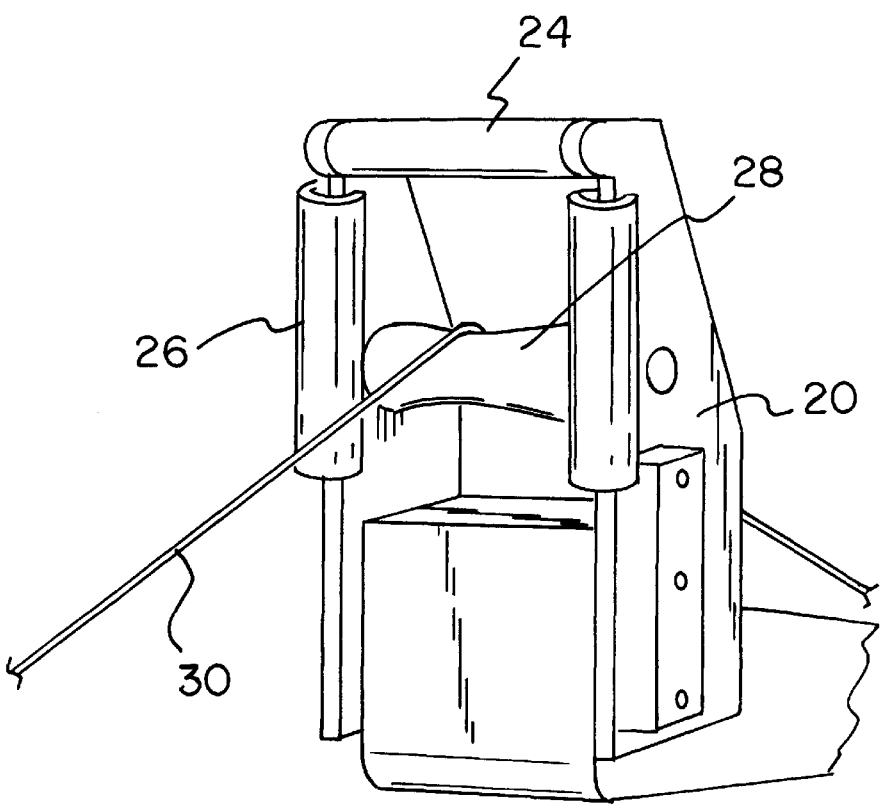
FIG. 2 is a perspective view of the present invention.
Figure 3:
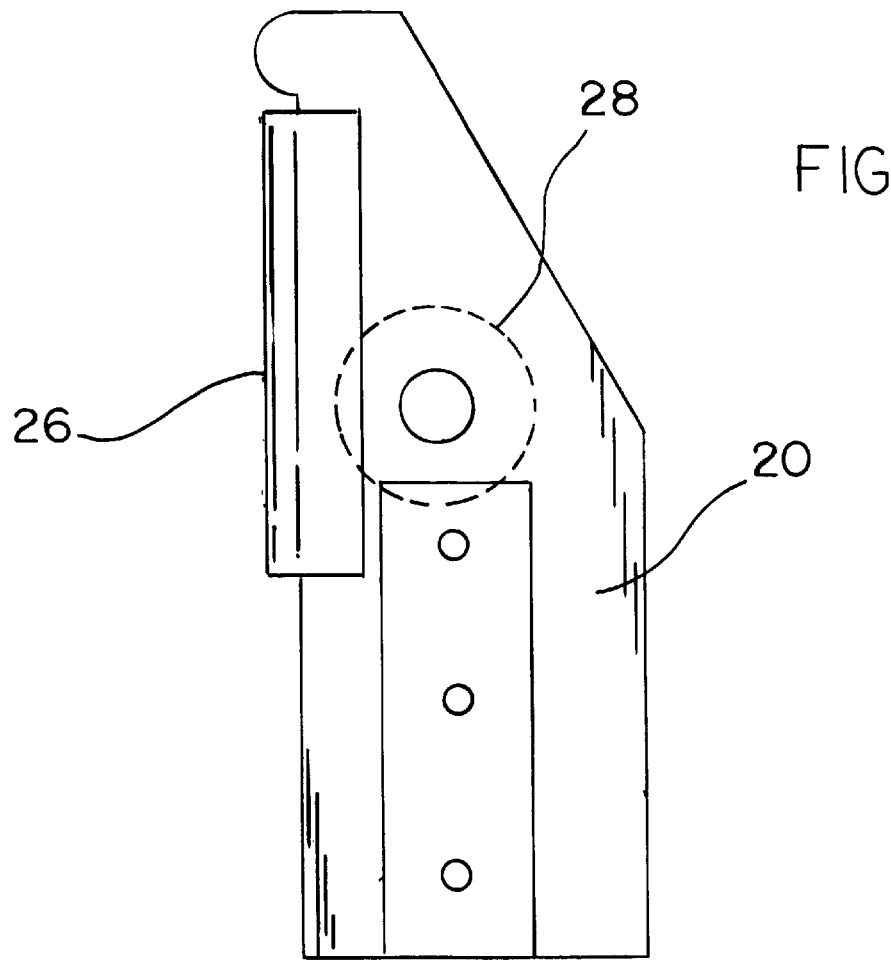
FIG. 3 is a side elevation view of the present invention.
Figure 4:
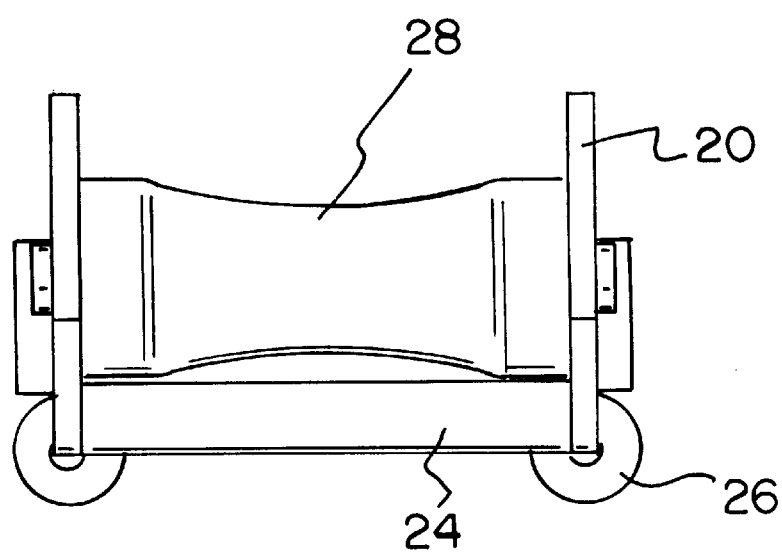
FIG. 4 is a top plan view of the present invention.

With reference now to the drawings, and in particular to FIGS. 1 through 4 thereof, a new logging tractor accessory embodying the principles and concepts of the present invention and generally designated by the reference numeral 10 will be described.

As best illustrated in FIGS. 1 through 4, the logging tractor accessory 10 comprises a housing 12 secured to an arch 14 of a logging tractor 16 equipped with grapple-style skidding elements 18. The housing 12 includes a pair of upwardly extending side members 20 disposed in a parallel relationship. Upper ends of the side members 20 have a horizontal support 22 extending therebetween.

Three guide members are provided including an upper guide member 24 and a pair of side guide members 26. The upper guide member 24 extends between the upper ends of the side members 20 in a horizontal orientation. The pair of side guide members 26 are secured to leading edges of the side members 20.

A roller 28 is secured between the side members 20 downwardly of the horizontal support 22. The roller 28 receives a cable 30 from the logging tractor 16 thereover.

In use, the present invention would permit the use of a cable 30 and grapple 18 in tandem. Note FIG. 1. Specifically, it would permit the cable 30 to be routed over and supported at the upper end of the arch 14 that supports the grapple 18.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A logging tractor accessory for supporting a cable from grapple-style skidding implement comprising, in combination:

a housing secured to an arch of a logging tractor equipped with grapple-style skidding elements, the housing including a pair of upwardly extending side members disposed in a parallel relationship;

three elongate guide members including an upper guide member and a pair of side guide members, the upper guide member extending between the upper ends of the side members in a horizontal orientation, the pair of side guide members secured to leading edges of the side members;

wherein each of the side members of the housing has a tab extending outwardly from the forward edge thereof, each of the tabs being positioned towards the upper ends of the guide members, the upper guide member extending between the tabs; and a roller secured between the side members downwardly of the horizontal support, the roller receiving a cable from the logging tractor thereover.

2. The logging tractor accessory of claim 1, wherein each of the side members of the housing has a back edge opposite the leading edge of the associated side member, each of the back edges of the side members of the housing having an upper portion and a lower portion, each of the upper portions of the back edges of the side members tapering towards the leading edges.

3. The logging tractor accessory of claim 1, wherein each of the guide members has a generally C-shaped transverse cross section taken perpendicular to a longitudinal axis of the respective guide members.

4. A logging system comprising, in combination:

a logging tractor having an arch extending from a front thereof;

a housing secured to the arch of the logging, the housing including a pair of upwardly extending side members disposed in a parallel relationship;

three elongate guide members including an upper guide member and a pair of side guide members, the upper guide member extending between the upper ends of the side members in a horizontal orientation, the pair of side guide members secured to leading edges of the side members;

wherein each of the side members of the housing has a tab extending from the forward edge thereof, each of the tabs being positioned towards the upper ends of the guide members, the upper guide member extending between the tabs; and a roller secured between the side members downwardly of the horizontal support, the roller receiving a cable from the logging tractor thereover.

5. The logging system of claim 4, wherein the arch has a log grapple coupled to a free end thereof, the log grapple having a pair of opposed grapple-style skidding elements extending from opposed sides thereof.

6. The logging system of claim 5, wherein each of the grapple-style skidding elements has an arm portion and a hook portion extending at an obtuse angle the arm portion towards the opposing skidding element.

7. The logging system of claim 4, wherein the logging tractor has a winch coupled to the front thereof, the winch being for collecting the cable.

8. The logging system of claim 4, wherein each of the side members of the housing has a a back edge opposite the leading edge of the associated side member, each of the back edges of the side members of the housing having an upper portion and a lower portion, each of the upper portions of the back edges of the side members tapering towards the leading edges.

9. (New) The logging system of claim 4, wherein each of the guide members has a generally C-shaped transverse cross section taken perpendicular to a longitudinal axis of the respective guide members.

10. A logging system comprising, in combination:

a logging tractor having an arch extending from a front thereof;

the arch having a log grapple coupled to a free end thereof, the log grapple having a pair of opposed grapple-style skidding elements extending from opposed sides thereof;

each of the grapple-style skidding elements having an arm portion and a hook portion extending at an obtuse angle the arm portion towards the opposing skidding element;

the logging tractor having a winch coupled to the front thereof, the winch having a length of cable wrapped therearound;

a housing secured to the arch of the logging tractor, the housing including a pair of upwardly extending side members disposed in a parallel relationship;

three elongate guide members including an upper guide member and a pair of side guide members, the upper guide member extending between the upper ends of the side members in a horizontal orientation, the pair of side guide members secured to the leading edges of the side members;

each of the side members of the housing having a back edge opposite the leading edge of the associated side member, each of the back edges of the side members of the housing having an upper portion and a lower portion, each of the upper portions of the back edges of the side members tapering towards the leading edges;

each of the guide members having a generally C-shaped transverse cross section taken perpendicular to a longitudinal axis of the respective guide members wherein each of the side members of the housing has a tab extending from the forward edge thereof, each of the tabs being positioned towards the upper ends of the guide members, the upper guide member extending between the tabs; and a roller secured between the side members downwardly of the horizontal support, the roller receiving the cable from the winch of the logging tractor thereover.

* * * * *